United States Patent [19]

Simmons

[11] Patent Number: 4,707,886

[45] Date of Patent: Nov. 24, 1987

[54] POULTRY OIL SAC REMOVAL METHOD AND APPARATUS

[76] Inventor: Lacy Simmons, 101 Simmons Industrial Blvd., Dallas, Ga. 30132

[21] Appl. No.: 923,400

[22] Filed: Oct. 27, 1986

Related U.S. Application Data

[60] Continuation-in-part of Ser. No. 761,424, Aug. 1, 1985, Pat. No. 4,619,017, which is a division of Ser. No. 284,087, Jul. 16, 1981, Pat. No. 4,532,676, and Ser. No. 517,811, Jul. 27, 1983, Pat. No. 4,550,473, each is a continuation-in-part of Ser. No. 873,370, Jan. 20, 1978, abandoned.

[51] Int. Cl.$^4$ .............................................. A22C 21/00
[52] U.S. Cl. ............................................ 17/45; 17/11
[58] Field of Search ................................. 17/11, 45, 52

[56] References Cited

U.S. PATENT DOCUMENTS 3,213,488 10/1965 Volpe ........................................ 17/11
4,183,118 1/1980 Graham et al. ..................... 17/11 X Primary Examiner—Willie G. Abercrombie
Attorney, Agent, or Firm—Eric P. Schellin

[57] ABSTRACT

The present invention is directed to an oil sac removal assembly comprising an apertured plate having an inwardly bevelled aperture which is pressed against the tail section of a bird, so that the oil sac protrudes through the aperture. A scraper then engages a portion of the protruding oil sac and peels it from the bird. The scraper also engages the plate for pressing it against the tail section of the bird. The apertured plate is loosely and pivotally mounted in a supporting frame so that it is self seating against the oil sac and can better accommodate different sized birds because it is free to move in a limited manner in both the horizontal and vertical planes.

21 Claims, 7 Drawing Figures

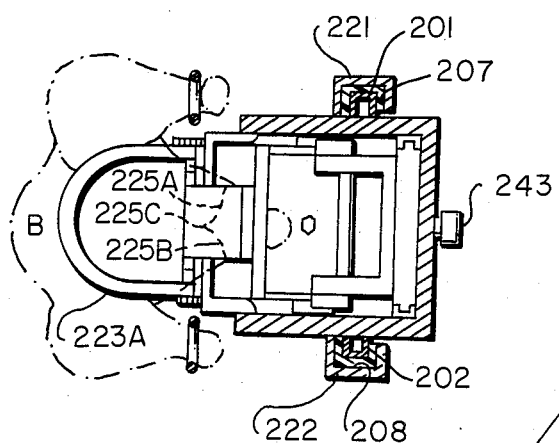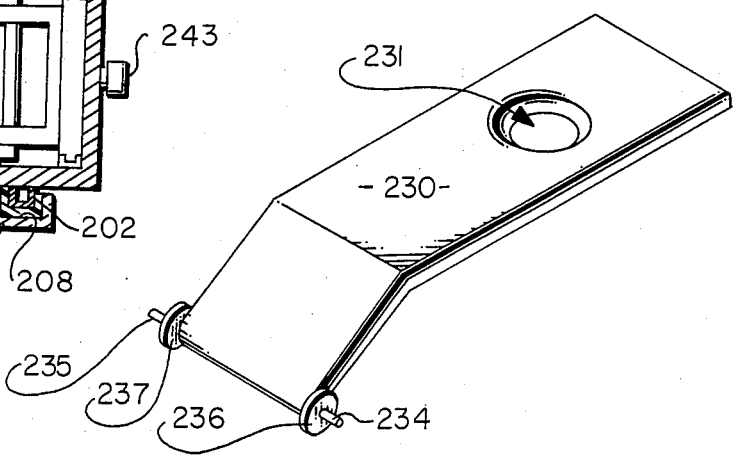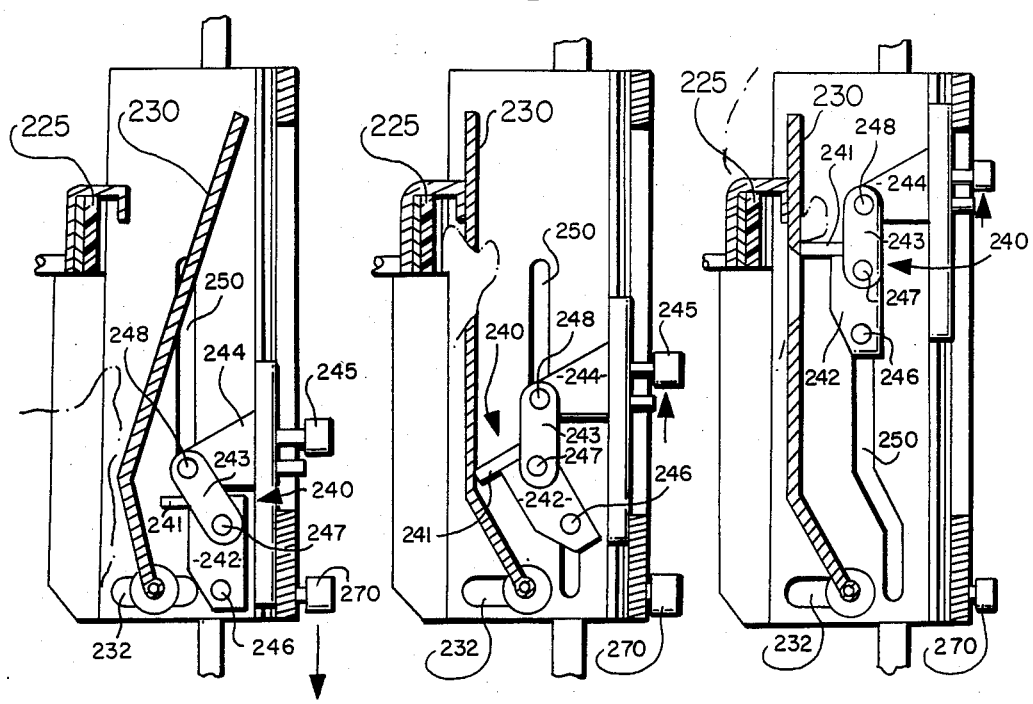

POULTRY OIL SAC REMOVAL METHOD AND APPARATUS

BACKGROUND OF THE INVENTION

The present patent application is a Continuation-In-Part of U.S. Patent Application Ser. No. 761,424 Filed: Aug. 1, 1985, now U.S. Pat. No. 4,619,017 which is a Divisional Application OF U.S. Pat. No. 4,532,676, and Ser. No. 517,811, filed 7/27/83, now U.S. Pat. No. 4,550,473 which are Continuation-In-Parts of U.S. patent application Ser. No. 873,370, filed: Jan. 20, 1978, abandoned.

1. Field of the Invention

The invention is directed to a poultry processing apparatus and more specifically to the oil sac removal apparatus. The oil sac protrudes through a self seating apertured plate and is peeled from the bird by a movable scraper.

2. Description of the Prior Art

Poultry are provided with an oil sac located at the bird's tail section which must be removed in the poultry processing operation. The applicant in a previous patent, U.S. Pat. No. 4,532,676, which is incorporated herein by reference, disclosed peeling the oil sac from a bird in an automated fashion. In this patent, the oil sac is peeled from the bird by the upward movement of an apertured plate which engages the oil sac and peels it against an anvil assembly. The oil sac removal apparatus is mounted on a support module which is mounted together with other support modules on a conveyor which positions each module, in turn, opposite a bird on the poultry processing line. The modules then perform various processing operations such as neck breaking and oil sac removal, and release the birds for further processing. The modules themselves are then returned to the front of the line where they can process additional birds.

The present invention is an improvement of the previous oil sac removal apparatus disclosed in this patent, but is readily adaptable to the support module disclosed in this patent.

SUMMARY

In the present invention the bird is captured and positioned in the module by an engaging and holding assembly that positions the birds tail portion opposite the oil sac removal assembly. After the bird is held in place, an apertured plate is pressed against the bird's tail section so that the oil sac protrudes through the apertured plate. A scraping assembly on the other side of the apertured plate then engages a portion of the oil sac protruding therethrough and with an upward motion peels the oil sac from the bird. The apertured plate is readily adaptable to different sized birds by being loosely mounted on a supporting frame so that it is self seating against the oil sac.

The scraper is also mounted on the supporting frame and is provided with at least one cam follower that is positioned in at least one cam track which directs the scraper to first push the apertured plate against the bird's tail section and second to peel the oil sac from the tail section by engaging the protruding oil sac during the scraper's upward movement. The aperture in the apertured plate is bevelled inwardly away from the bird, so that the oil sac is better accomodated in the aperture.

BRIEF DESCRIPTION OF THE DRAWINGS

FIG. 3 is a top cross sectional view of the oil sac removal assembly.

FIG. 4 is a perspective view of the apertured plate.

FIGS. 5, 6 and 7 are in sequence and are fragmentary cross sectional views of the oil sac removal assembly in operation.

DETAILED DESCRIPTION

It should be noted initially, that the oil sac removal assembly of the present invention is adapted to be mounted on a support module that is mounted together with other support modules on a conveyor line adjacent to the path of a poultry processing line. The structure of the conveyor and its drive assembly are better illustrated and disclosed in U.S. Pat. No. 4,532,676, incorporated herein by reference, and as such will only be briefly discussed as they relate to the improved oil sac removal assembly to which this patent application is directed.

Figure 1:
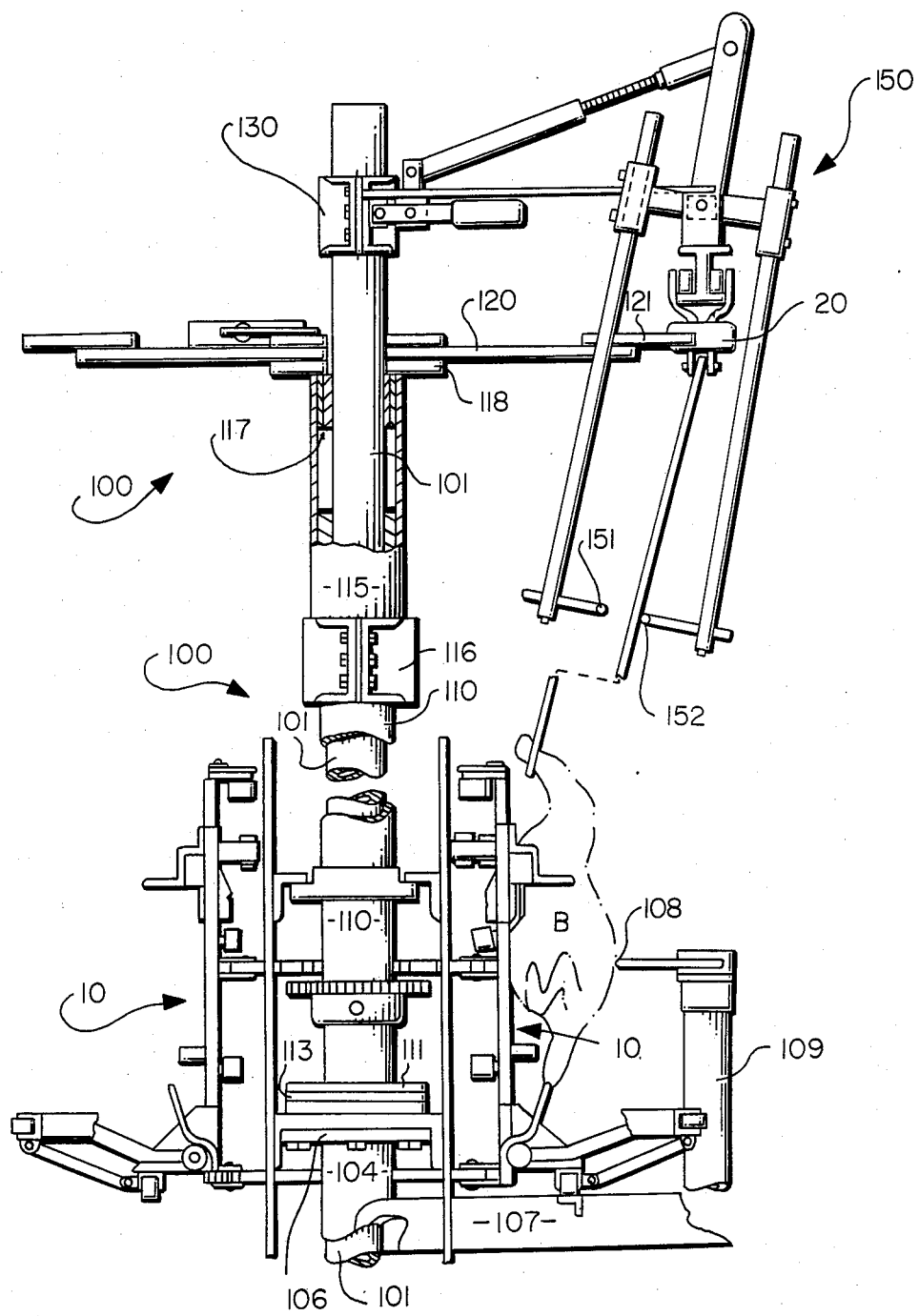
FIG. 1 is a fragmentary side view of the invention partially in cross section showing side views of the modules of the invention.
Figure 2:
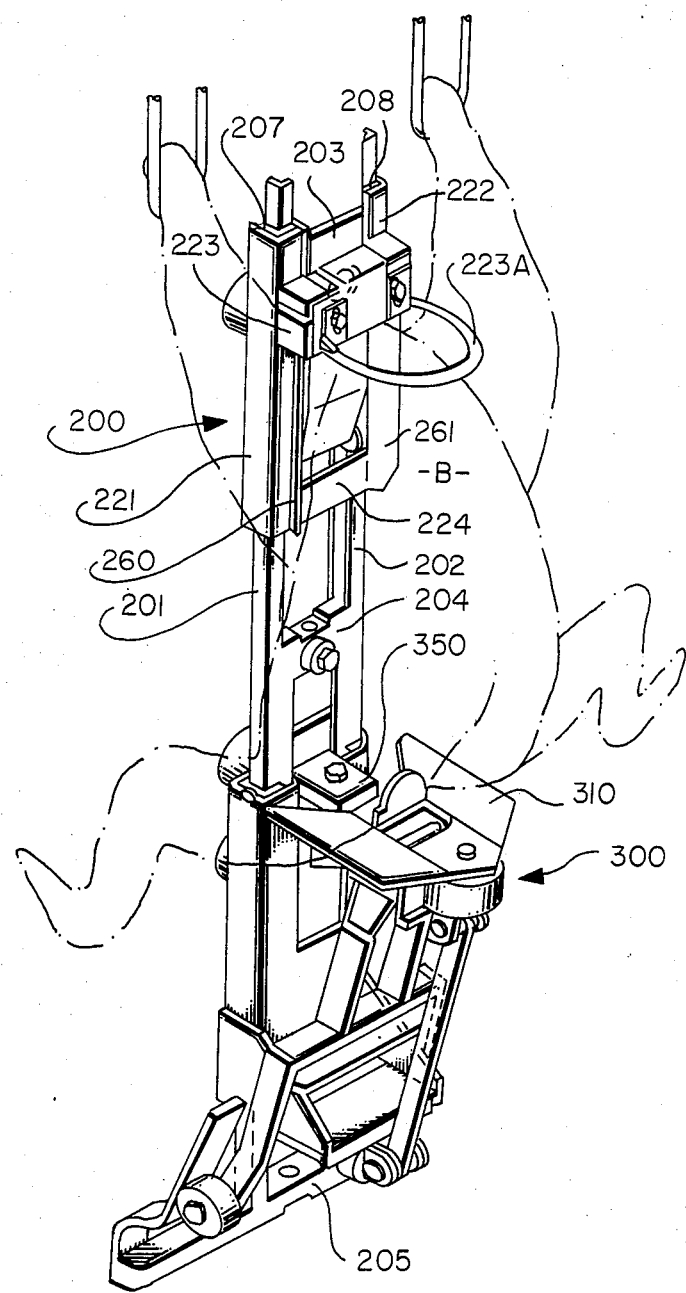
FIG. 2 is a perspective view of the module.

As illustrated in FIG. 1 support modules 10 are mounted on module support and drive mechanism assembly 100. The frame support portion of assembly 100 comprises single post 101 which is mounted to the floor. Pipe element 104 is fitted over post 101 and is provided with bearing plate 106. Fitted above pipe 104 is pipe 110 which is provided with bearing plate 111 which rests on bearing member 113 resting on bearing plate 106. Pipe element 115 is journalled around pipe post 101 and secured to pipe 110 by clamp 116. The upper end of pipe 115 is provided with bearing sleeve 117 which is fitted between post 101 and pipe 115.

Plate 118 is fixed to the upper end of pipe 115 and is provided with drive wheel 120. The drive wheel is provided with raidally extending lugs 121 which engage shackle support assemblies 20 so that the poultry processing line effects the rotary movement of drive wheel 120 and thereby pipes 115 and 110.

Guide means 150 is secured to post 101 by clamp assembly 130 and is provided with a pair of guide bars 151 and 152 that direct poultry supporting shackles 30 to modules 10. In addition support arm 107 is fixed to pipe 104 and is provided with vertical portion 109 having guide 108 that directs bird B hanging from supporting shackle 30 to module 10. As such when the guide means is positioned as illustrated in FIG. 1, the shackles supporting the birds will be advanced in a path adjacent to the modules.

The module is provided with channel shaped frame elements 201 and 202 that are supported in spaced relationship by transverse connecting bars 203, 204 and 205 thereby forming a module support means.

Oil sac removal assembly 200 is slidably mounted on frame members 201 and 202. Assembly 200 is provided with a pair of channel shaped frame members 221 and 222 which are fitted around the outer surface of frame elements 201 and 202. Conventional bearing means 207 and 208 are fitted between the frame members and elements to permit free sliding movement. Frame members 221 and 222 are fixed in spaced relationship by transverse frame portions 223 and 224, which together with the frame members form a supporting frame. Transverse frame portion 223 includes an outwardly projecting curved portion 223a operable for engaging and aligning poultry supporting shackles present adjacent thereto in the processing operation.

Also supported on frame member 223 is a shaped poultry tail confining and holding block 225. Block 225 includes inwardly directed sloping surfaces 225a and 225b, flowing to a tail bone alignment channel 225c. The tail alignment and confinement block form a means for engaging and holding the tail portion of the bird, as shown in the drawings, during an oil sac removal operation.

Apertured plate 230 having inwardly bevelled aperture 231 is loosely and pivotally mounted in the supporting frame between frame members 221 and 222 in enlarged grooves 232. The apertured plate is provided with two outwardly projecting pivot pins 234 and 235 which are positioned in the enlarged grooves and provide that the apertured plate is free to move at least a limited amount in the horizontal and vertical plane. In this way the apertured plate, when pressed against the tail section of the bird, is self seating against the oil sac and as such can more readily accomodate different sized birds. The pivot pins are provided with flanges 236 and 237 that are larger then the groove openings to prevent dislodgement of the apertured plate.

Scraping means 240 is also positioned between frame members 221 and 222 on the supporting frame. Scraping means 240 comprises scraper 241 mounted on scraper support 242 which is coupled to link 243 which in turn is operatively coupled to support bracket 244 of cam follower 245. The scraper support and link are provided with outwardly projecting cam follower pairs 246, 247 and 248 that are mounted in cam slot 250 located on both sides of the support frame. During the upward movement of cam follower 245 link 243 draws scraper support 242 upwardly pushing scraper 240 against the apertured plate. As the apertured plate is pressed against the tail portion of the bird the oil sac protrudes therethrough, where it is peeled off by the further upward movement of the scraper.

As shown in the drawings, the oil sac removal assembly includes a number of guide and allignment elements. Angularly disposed plate elements 260 and 261 which extend outwardly from frame elements 221 and 222 contact the back of the bird to effectively center the bird to the oil sac removal assembly.

Oil sac removal assembly 200 is normally supported in an elevated position above the birds by cam follower 270 contacting a cam track located on support and drive mechanism 100. The oil sac removal apparatus is lowered onto the bird by a downwardly sloping cam track in timed relationship with the movement of the module into engagement which the bird moving along the processing line. Alignment block 225 contacts the rump of the bird adjacent to the bird's tail to provide a means for effectively identifying the location of the bird's tail section and oil sac. After the oil sac has been removed the oil sac removal assembly is raised and the scraper means returned to its initial position. The module is then returned to a position up the processing line where it can engage and process another bird.

The module is also provided with neck breaking assembly 300 having V-shaped bird neck aligning and holding assembly 310 and neck breaking block 350. The V-shaped aligning and holding assembly is upwardly pivotted against the neck of the bird forcing the neck against the breaking block. The breaking block is then downwardly drawn separating the neck from the bird.

The neck breaking operation is done simultaneously with the oil sac removal operation, and is disclosed in greater detail in U.S. Pat. No. 4,532,676, incorporated herein by reference.

After the neck breaking and oil sac removal operations the bird is released and returned up the poultry processing line to process another bird. During this return step the support frame is returned to its initial starting position and the breaker block withdrawn. In addition the assemblies are washed by a washing means to clean the assemblies before processing another bird.

The subject invention should not be limited by the above described and illustrated embodiment, but rather should be limited solely by the claims that follow.

I claim:

1. A method of removing an oil sac from a bird in a poultry processing operation, including the steps of:
    engaging the bird in such a manner so as to identify the location of the bird's tail section containing the oil sac;
    holding the bird's tail section against displacement;
    applying pressure to the bird's tail section around the oil sac to cause the oil sac to protrude outwardly from the bird through an apertured plate; and
    peeling the oil sac from the bird by a movable scraping means for engaging a portion of the oil sac protruding through the apertured plate and displacing the scraping means thereby effecting peeling of the oil sac from the bird.

2. A method of removing an oil sac from a bird as defined by claim 1 whereby pressure is applied to the bird's tail section by pivoting the apertured plate against the bird's tail section so that the oil sac protrudes therethrough.

3. A method of removing an oil sac from a bird as defined by claim 2 whereby the apertured plate is self seating against the oil sac of the bird so that it can accommodate different sized birds.

4. A method of removing an oil sac from a bird as defined by claim 3 whereby the pivoting of the apertured plate against the bird's tail section is accomplished by the scraping means pushing against the apertured plate.

5. A method of removing an oil sac from a bird as defined by claim 4 wherein the bird is advanced in a head lowermost position along a predetermined path in a poultry processing line during the oil sac removal operation.

6. A method of removing an oil sac from a bird as defined by claim 5 wherein the bird engaging step includes lowering a reference means onto the rump of the bird so as to position the oil sac removing means at a proper elevation adjacent to the bird's oil sac.

7. A method of removing an oil sac from a bird as defined by claim 6 including the additional step of supporting the bird engaging means and the oil sac removing means on a module support means which is advanced in timed relationship with the bird and along a path adjacent to the poultry processing line.

8. A method of removing an oil sac from a bird as defined by claim 7 including the additional step of releasing the module supported elements from the bird after the oil sac removal operation has been completed.

9. A method of removing an oil sac from a bird as defined by claim 8 including the additional step of returning the module to a position up the poultry processing line for operative engagement with another bird to perform the oil sac removal operation.

10. A method of removing an oil sac from a bird as defined by claim 9 including the addition step of washing the module as the module is being returned to a position up the poultry processing line.

11. An apparatus for removing the oil sac from a bird in a poultry processing operation, comprising:
- means for engaging the bird in such a manner so as to identify the location of the bird's tail section containing the oil sac;
- means for holding the bird's tail section against displacement;
- means for applying pressure to the bird's tail section around the oil sac to cause the oil sac to protrude outwardly from the bird through an apertured plate; and
- means for peeling the oil sac from the bird by a movable scraping means for engaging a portion of the oil sac protruding through the apertured plate and displacing the scraping means thereby effecting peeling of the oil sac from the bird.

12. An apparatus for removing the oil sac from a bird as defined by claim 11 comprising a supporting frame on which the means for engaging, the means for holding, the means for applying pressure, and the means for peeling are mounted.

13. An apparatus for removing the oil sac from a bird as defined by claim 12 wherein the apertured plate is loosely and pivotally mounted to the supporting frame so that it is self seating against the oil sac of the bird, thereby accommodating different sized birds.

14. An apparatus for removing the oil sac from a bird as defined by claim 13 whereby the movable scraping means is provided with a camming means for directing the scraping means against the apertured plate, pressing the apertured plate against the tail section of the bird.

15. An apparatus for removing the oil sac from a bird as defined by claim 14 wherein the bird engaging means is provided with a reference means which is lowered onto the rump of the bird so as to position the apertured plate at a proper elevation adjacent to the oil sac of the bird.

16. An apparatus for removing the oil sac from a bird defined by claim 15 wherein the supporting frame is mounted on a module support means which can be advanced in timed relationship with the bird along a path adjacent to a poultry processing line.

17. An apparatus for removing the oil sac from a bird in a poultry processing operation, comprising:
- a supporting frame having means for engaging and holding a bird's tail against displacement and to identify the location of the oil sac;
- an apertured plate that is mounted to the supporting frame so that is can be pivoted to press against the tail section of the bird so that the oil sac of the bird extends through the aperture in the plate; and
- a scraping means is movably mounted on the supporting frame for engaging a portion of the oil sac protruding through the apertured plate and peeling the oil sac from the bird.

18. An apparatus for removing the oil sac from a bird as defined by claim 17 wherein the apertured plate is provided with two outwardly extending pivot pins which engage two enlarged grooves located in the supporting frame which are larger than the pivot pins so that the apertured plate is both loosely and pivotally mounted to the supporting frame, and is free for limited movement in both vertical and horizontal planes so that the apertured plate is self seating when pressed against the oil sac of the bird.

19. An apparatus for removing the oil sac from a bird as defined by claim 18 wherein the edge of the aperture located in the apertured plate is inwardly bevelled away from the bird to better accommodate the oil sac.

20. An apparatus for removing the oil sac from a bird as defined by claim 19 wherein the movable scraping means is provided with a cam follower means which is located in a camming slot located on the supporting frame for pushing the scraping means against the apertured plate, thereby pressing the plate against the tail section of the bird, and when the scraping means is drawn upwardly it peels the oil sac protruding through the apertured plate from the bird.

21. An apparatus for removing the oil sac from a bird as defined by claim 20 wherein the supporting frame is slidably mounted on a module support means so that it can be vertically positioned adjacent to the tail section of the bird.

* * * * *